Nov. 28, 1950          R. L. LONGINI          2,532,111
WELD TIMING CIRCUITS
Filed June 12, 1948          2 Sheets—Sheet 2
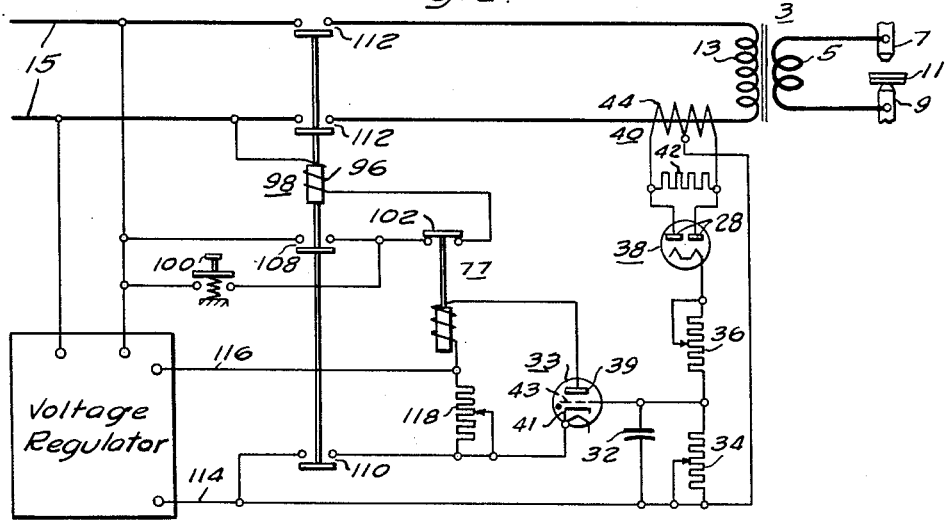
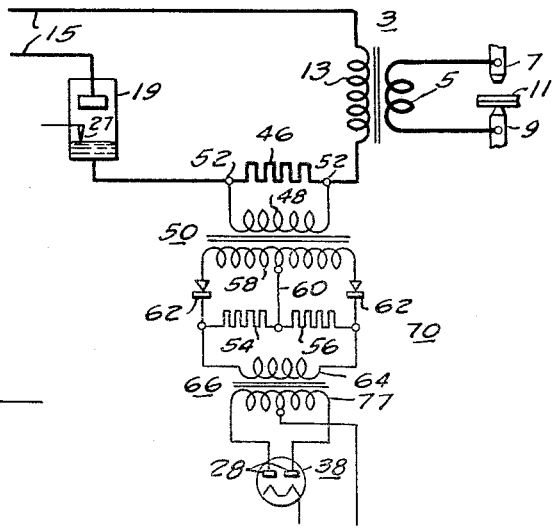
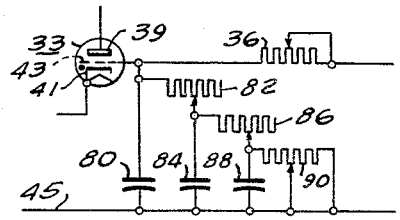
WITNESSES:
E. A. McCloskey.
Ross Rogers Jr.
INVENTOR
Richard L. Longini.
BY
Hymen Diamond
ATTORNEY Patented Nov. 28, 1950

2,532,111

UNITED STATES PATENT OFFICE 2,532,111

WELD TIMING CIRCUITS

Richard L. Longini, Pittsburgh, Pa., assignor to Westinghouse Electric Corporation, East Pittsburgh, Pa., a corporation of Pennsylvania Application June 12, 1948, Serial No. 32,572

24 Claims. (Cl. 219—4)

My invention relates to electric discharge apparatus, and it has particular relation to welding timers.

Each resistance welding operation is made up of a sequence of events which are initiated by the closing of the start switch for the welder. First, during the "Squeeze" interval, the welding electrodes engage the work and hold engagement for a predetermined time interval in the absence of welding current. Next, during the "Weld" interval welding current flows during a predetermined time interval. Thereafter, the electrodes are held in engagement with the work during a predetermined time interval, the "Hold" interval so that the melted metal may cool. After the electrodes are disengaged from the work, they are held open for a predetermined time interval to permit resetting of the welder for a new operation. The time interval from the start of the disengagement until the start of a new weld is called the "Off" interval.

The "Squeeze," "Weld," "Hold," and "Off," intervals are measured by the operation of electronic timers included in a welding system. Such timers include reactances, customarily capacitors, the time of charge or discharge of which measures out the necessary time intervals.

The most frequently employed "Weld" timer is an absolute timer which causes current to flow through each successive weld for the same length of time. With recent improvements, this device is accurate. The timing must, however, be changed if the shape or resistivity of the welded material is changed. No allowance is made in absolute timer for variation in the current supply.

Another prior art timer of which I am aware is found in the Wright Patent 2,024,019 which controls the welding time according to the current flow through the weld. Fig. 1 of this patent shows that his device employs a capacitor 70 which receives current through a series resistor 68. The time required for this capacitor to reach a predetermined potential is dependent upon the current flowing through the weld. A relay is opened when the potential across this capacitor reaches a high enough value to render the bulbs 72 conductive. This circuit allows for some variation in line voltage since a low welding current flows for a longer period of time than a high welding current. Uniformly strong welds are not, however, produced by this device when welding current varies over a relatively wide range.

It is, accordingly, an object of my invention to provide a welding system which shall operate to produce uniformly satisfactory welds.

Another object of my invention is to provide a welding system including an electronic timer which shall operate to produce uniform welds of properly fused unoxidized metal.

Another object of my invention is to provide a welding timer which will vary the duration of a weld in such a manner as to make allowances for varying conditions in the weld and in the welding current.

It is a more specific object of my invention to provide a weld timer which will produce a uniformly high temperature in a weld despite changes in the geometry of the welding material or the resistivity of the weld.

An ancillary object of my invention is to provide a novel regulating network of the alternating-current type.

Another ancillary object of my invention is to provide a novel electronic timer.

My invention arises from the realization that while the Wright structure does tend to deliver energy of a somewhat uniform magnitude, it fails to provide additional energy to compensate for the cooling which takes place in the weld during the welding process. The parameters of this circuit can probably be changed to make allowance for the changed power demands of different materials which are to be welded. Regardless of the setting, however, this device would not vary the amount of welding current in dependence upon the speed of the weld. That is, if a weld is being made by a heavy flow of current, the weld will reach a higher temperature than if energy of the same magnitude is used in ultimately effecting a weld with low current. In the latter situation, additional power is required to compensate for the cooling of the joint while the weld is progressing. This circuit does not make allowance for this difference and would, accordingly, allow energy of the same magnitude to flow into a high power short weld as would flow into a low power long weld. This circuit would not be applicable to a welding operation in which the maximum temperature of the weld is to remain constant while the magnitude of current flow varies.

A welder built according to my invention has in its timing circuit a capacitor which receives charge proportional to the energy which flows into the weld and loses charge proportional to the flow of heat from the weld. The potential across the capacitor is, then, proportional to the temperature of the weld, and this capacitor potential controls the time of the weld. By matching the thermal characteristics of the weld with the electrical characteristics of the control circuit I can cause the control circuit accurately to control the temperature of the weld.

The analysis that led to my invention is dependent upon the following physical facts. The rate of heat flow into a weld (the power consumed in the weld) is proportional to the square of the welding current. Since temperature is an approximately linear function of heat flow, the rate of temperature rise in the weld would be proportional to the square of the welding current if there were no simultaneous flow of heat from the weld. Most welding operations, however, are slow enough to allow a relatively large amount of heat to flow from the weld while welding current is flowing. This conduction of heat from the weld has been found to follow roughly an exponential decay law. Actual welding conditions represent a simultaneous gain and loss of heat. The temperature of the weld at any time might then be stated mathematically as $$T_{weld} = T_{room} + B \int_0^t I^2 e^{-\alpha t} dt \qquad (1)$$

where $T$ stands for temperature, $I$ is the welding current, $t$ is time, $B$ and $\alpha$ are empirical constants.

The voltage $V$ of a capacitor $C$ which is being charged through a resistor $R_1$ is proportional to $\int I dt$. The capacitor can be discharged according to the exponential decay law through a resistor $R_2$ placed across its terminals. In a timer in accordance with my invention, a timing capacitor of capacity $C$ is charged in dependence upon the load current through a resistor $R_1$ and is discharged through a resistor $R_2$. For such a capacitor, $$V = A \int_0^t E e^{-t/\frac{R_1 R_2}{R_1 + R_2} C} dt \qquad (2)$$

in which $A$ is a constant and $E$ is a voltage dependent on the load current.

I have provided one circuit which causes the voltage $E$ of this equation to be proportional to the square of the welding current and one circuit which causes voltage $E$ to be proportional to the welding current. The former is intended to provide completely accurate control. The latter provides control of sufficient accuracy for most applications. The specific application of Equation 2 to my invention will be explained later with reference to the drawings.

The novel features that I consider characteristic of my invention are set forth with particularity in the appended claims. My invention, itself, however, both as to its organization and its method of operation together with further objects and advantages thereof, will be understood by reference to the following description and to the drawings, in which:

Fig. 2 is a diagrammatic view of a modification of my invention;

Figure 1:
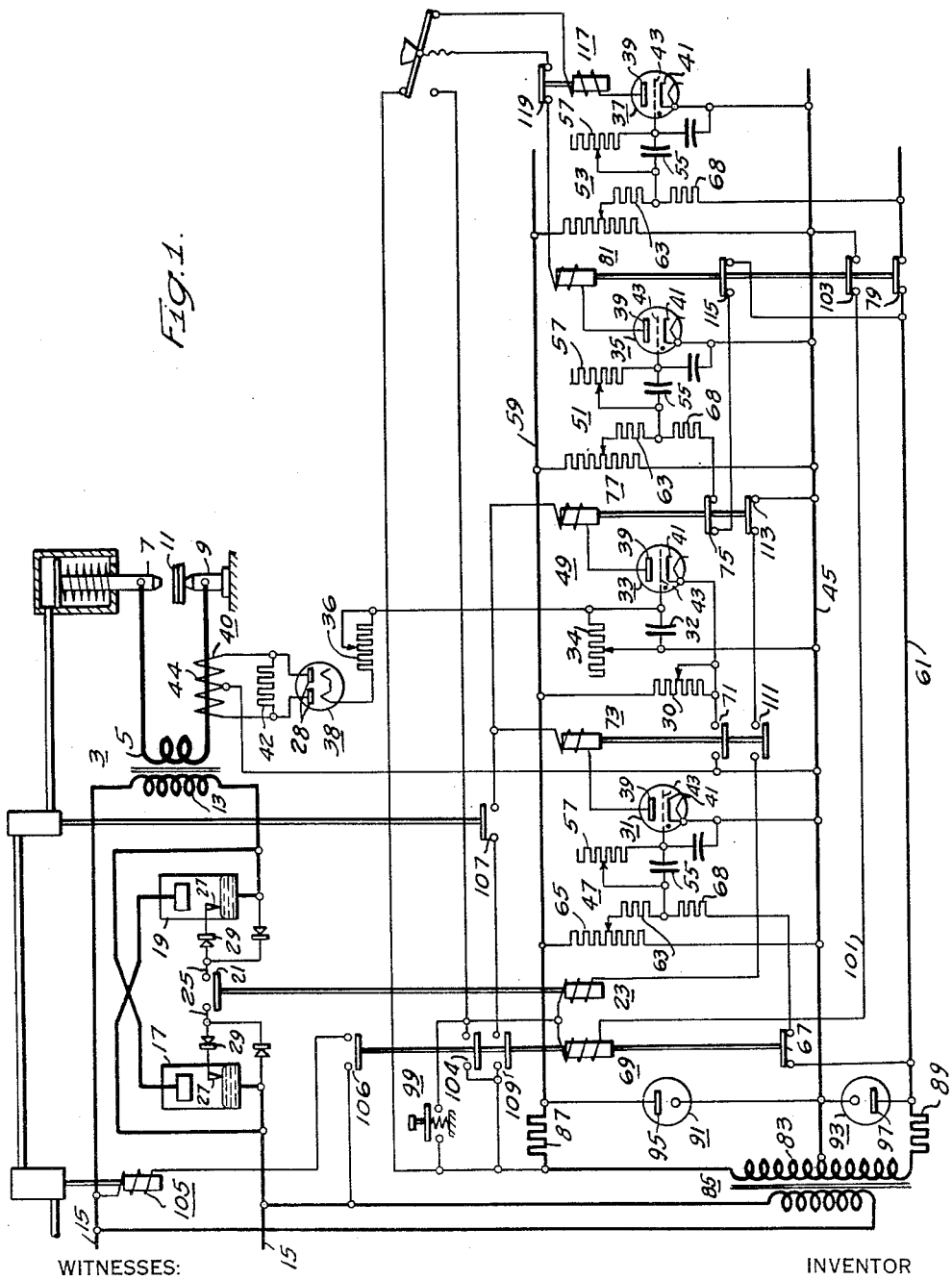
Figure 1 is a diagrammatic view showing an embodiment of my invention.

Fig. 3 is a diagrammatic view of a circuit component which, if placed in the circuit shown in Fig. 1 or 2 would control the duration of a weld according to the square of the welding current; and Fig. 4 is a diagrammatic view of a circuit component which could be placed in the circuit shown in Fig. 1 to cause the characteristics of the electrical circuit more closely to follow the thermal conduction characteristics of the welded materials.

The apparatus shown in Fig. 1 comprises a welding transformer 3 across the secondary 5 of which welding electrodes 7 and 9 are connected. One of the electrodes 7 is hydraulically movable in and out of engagement with the work 11. The primary 13 of the welding transformer is supplied from alternating-current power-supply buses 15, preferably of the commercial type, through a pair of ignitrons 17 and 19 connected in anti-parallel to conduct alternating current. The nominal magnitude of the commercial voltage selected may be as low as 200 (min. for ignitrons) volts or as high as 2300 volts.

The conductivity of the ignitrons 17 and 19 is controlled by a normally open movable contactor 21 of a control relay 23. When this relay is energized, the contactor closes a circuit through conductors 25 interconnecting the ignitors 27 of the ignitrons through rectifiers 29, preferably of the dry type. Depending on the polarity of the supply, firing current is conducted through the ignitor 27 of one or the other of the ignitrons 17 or 19, and that ignitron is rendered conductive. During the succeeding half-period of the supply, firing current is conducted through the ignitor of the other ignitron, and the latter is rendered conductive. The ignitrons continue to conduct alternating current so long as the movable contactor 21 of the control relay 23 remains closed.

The actuation of the control relay 23 is dependent on the operation of a timing system. The latter includes a plurality of thyratrons 31, 33, 35 and 37, each having an anode 39, a cathode 41, and a control electrode 43 (in addition to any other electrodes which the thyratrons available in the art may have). Each thyratron is connected in an electronic timing circuit designed to perform one of the sequential timing operations "Squeeze," "Weld," "Hold," or "Off," of the welder.

The grid of the thyratron 33 associated with the weld timing circuit is connected through a capacitor 32 and variable resistance 34 to the line conductor 45. The cathode 41 of this thyratron is connected to the line conductor 45 through the normally open contactor 71. The cathode 41 is connected to the line conductor 59 through variable resistor 30.

The control electrode 43 of this thyratron 33 is connected through a capacitor 32, a resistor 34, a resistor 36, and a rectifier 38, the secondary 44 of a current transformer 40, to line conductor 45. The secondary 44 of the current transformer 40 is placed so as to receive welding current inductively from the secondary 5 of the welding transformer 3. A center tap in the secondary 44 is connected to the line conductor 45. A bleeder resistor 42 is connected between the terminals of the current transformer secondary 44.

The cathodes 41 of the other three thyratrons 31, 35 and 37 are connected to a line conductor 45 common with these three timers. Each of these three timing circuits includes a timing network 47, 51, 53, respectively, including a capacitor 55 having a voltage divider 57 connected in parallel therewith. One terminal of each of the networks 47, 51, 53 is connected to the control electrode 43 of the associated thyratron. The other terminal of the network is connected through separate channels to the two line conductors 59 and 61; to the first conductor 59 through a resistor 63 and a voltage divider 65, and to the second conductor 61 through another resistor 68 and the normally closed contactor of an associated relay. The "Squeeze" network 47 is connected to the line conductor 61 through the contactor 67 of the start relay 69, the "Hold" network 51 through the contactor 75 of the "Weld" relay 77, and the "Off" network 53 through the contactor 79 of the "Hold" relay 81.

The line conductor 45 is connected to the center tap of the secondary 83 of a transformer 85. The other line conductors 59 and 61 are connected through resistors 87 and 89 to the terminal taps of the secondary 83. Between the center conductor 45 and each of the terminal conductors 59 and 61, an asymmetrically conductive voltage regulator 91 and 93, respectively, is connected. The cathodes 95 of the regulators are connected together to the center conductor 45 and the anode 97 of each regulator is connected to a separate terminal line conductor. The regulators are thus connected so as to conduct positive current in a direction from the control electrodes 43 to the cathodes 41 of the thyratrons 31, 33, 35, and 37. Each of the voltage regulators 91 and 93 is selected to conduct at a potential lower than the potential impressed between its associated line conductors 59—45 and 61—45. Preferably, the voltage regulator should start to conduct at an instant approximately 30° after the zero instant in the half-period of the supply during which it is conductive. The regulators 95 and 97 operate to maintain the potentials existing across the line conductors of uniform amplitude and flat top wave form.

When the upper line conductor 59 is negative relative to the central line conductor 45 and contactor 71 is open, the control electrode 43 of the thyratron 33 associated with the weld timing circuit is positive relative to its cathode 41, and grid current flows through the capacitor 32 and resistor 30 charging capacitor 32 with its right-hand plate negative and its left-hand plate positive. When the contactor 71 is closed, the charge on this capacitor 32 initially causes the control electrode 43 of the thyratron 35 to be biased negative with respect to the cathode 41. This negative bias is equal to the amplitude of the flat top potential derived from the line conductors.

When the lower line conductor 61 is positive relative to the central line conductor 45, the control electrodes 43 of the thyratrons 31, 35, 37 are positive relative to their respective cathodes 41 and current flows through the associated normally closed contactors 67, 75, 79 to charge the capacitors 55 in the associated networks 47, 51, 53 with its right-hand plate negative and its left-hand plate positive. A bias potential is thus impressed in the control circuit of each thyratron which is equal to the amplitude of the potential of flat top wave form derived from the line conductors. The potential which is impressed between the control electrodes 43 and the cathodes 41 of the thyratrons is composite and is made up of the flat top wave form potential impressed through the voltage dividers 65 from the upper line conductor 59 and the bias potential of the associated networks. The thyratrons are, under such circumstances, biased to non-conductivity; the flat top wave form potential superimposed on the bias is insufficient to render the thyratrons conductive.

To initiate a welding operation, the work 11 is disposed on the lower electrode 9 and a start switch 99 is closed. Current flows from the upper terminal of the secondary 83 through the start switch 99, the exciting coil of the start relay 69, a conductor 101, normally closed contactor 103 of the "Hold" relay 81, to the center line conductor 45. The start relay is actuated, and is locked in through one of its normally open (but now closed) contactors 104. The upper normally open contactors 106 of the relay also close a circuit through the exciting coil of the solenoid 105 which controls the hydraulic fluid supply for the movable electrode 7. The movable electrode engages the work; when it has properly engaged the work, a back-pressure contactor 107 is closed.

When the start relay 69 is actuated, its normally closed contactor 67 is also opened, opening the charging circuit for the "Squeeze" timing capacitor 55. The capacitor, therefore, discharges through its associated voltage divider 57. After the capacitor potential has decreased to a predetermined magnitude, the composite control potential on the "Squeeze" thyratron 31 is such as to render this thyratron conductive. Under such circumstances, current flows from the upper terminal of the secondary 83 through another now closed contactor 109 of the start relay 69, the back-pressure contactor 107, the exciting coil of the "Squeeze" relay 73, the thyratron 31 to the center line conductor 45. The "Squeeze" interval, that is, the time interval between the closing of the start switch 99 and the actuation of the "Squeeze" relay, is determined by the setting of the voltage divider 57, in the "Squeeze" network 47.

When the "Squeeze" relay 73 is actuated, its normally open contactor 71 closes. The cathode 41 of the thyratron 33 of the weld circuit is now connected to the central line conductor 45. The actuation of the "Squeeze" relay also results in the closing of normally open contacts 111. Current flows in a circuit from the upper terminal of the secondary 83 through now closed contactor 104 of the start relay 69, the exciting coil of the control relay 23, the now closed contact 111 of the "Squeeze" relay, normally closed contactor 113 of the "Weld" relay to the center line conductor 45. The control relay is now actuated closing the firing circuits for the ignitrons 17 and 19, and welding current is supplied through the work 11. The time interval during which welding current flows is determined by the "weld" network 49.

Current is flowing in the welding transformer 3 inducing current in the secondary 44 of the current transformer 40. The current is rendered unidirectional by the rectifier 38 and passed through the variable resistor 36 to charge the condenser 32. By the current flow through the rectifier 38, the capacitor 32 is charged with its right-hand plate positive and its left-hand plate negative—that is, this charge establishes a potential opposing the bias. When sufficient current has passed through the variable resistor 36 to charge the capacitor 32 to a high enough potential to overcome the bias on the thyratron 35, the thyratron 35 becomes conductive, passing current from the central conductor 45 through the now closed contactor 71, the exciting coil of the hold relay 77, the back-pressure contactor 107, contactor 109 to the upper terminal of the secondary 83.

The "Weld" relay 77 is actuated by the current flow. The lower contactor 113 of this relay is now opened, opening the circuit through the exciting coil of the control relay 23. The firing circuits of the ignitrons 17 and 19 are then opened, and the last ignitron to conduct becomes non-conductive at an instant following the zero instant of the potential supplied to it by a magnitude predetermined by a reactance of the welding transformer.

If this circuit is employed, the voltage E in Equation 2 will be proportional to the current in a welding electrode. While the curve of temperature in the weld vs. time will not have exactly the same shape as the curve of voltage across the condenser 32 vs. time, the two curves will vary in shape and slope in dependence upon varying conditions in the weld in substantially the same way and variations in the two curves will be in the same direction although not precisely of the same magnitude. In order to lower the cost of the welding timer, this circuit arrangement will probably be used inasmuch as it controls the weld time approximately according to the temperature of the weld. This accuracy will be sufficient for most applications.

The actuation of the "Weld" relay 77 also results in the opening of its normally closed contactor 75 and the discontinuance of the supply of potential to the timing capacitor 55 in the "Hold" network 51. After a predetermined time interval, as determined by the setting of the voltage divider 57 of the "Hold" network, the "Hold" relay 81 is actuated. The normally closed contactor 103 of the relay opens, opening the circuit through the start relay 69. The start relay now drops out, and the fluid pressure solenoid 105 is deenergized, the anode circuit through the "Squeeze" and "Weld" thyratrons 31 and 33 respectively opened at the back-pressure contactor 107 and the connection between the conductor 61 and the "Squeeze" thyratron 31 is deenergized, the "Squeeze" relay 73 drops out, opening the circuit of the exciting coil of the control relay 23 at contactor 111 and opening contactor 71 to begin charging the "Weld" timing capacitor. The dropping out of the "Weld" relay 77 does not reclose the charging circuit for the "Hold" capacitor 55. This circuit is maintained open by now open contactor 115 of the "Hold" relay 81.

At the now open contactor 79 of the "Hold" relay 81, the charging circuit for the timing capacitor 55 of the "Off" network 53 is opened. This capacitor discharges and after a predetermined time interval, the "Off" thyratron 37 is energized and the "Off" relay 117 actuated. The normally closed contactor 119 of this relay is now opened, opening the circuit through the "Hold" thyratron 35 deenergizing the "Hold" relay 81 and resetting the system for another operation. When the "Hold" relay 81 is actuated, its normally closed contactor 79 recloses the charging circuit for the "Off" timing capacitor 55 and the latter is charged. The "Off" thyratron 37 becomes non-conductive when its grid capacitor is charged.

The timing system described above operates to provide accurate timing of the sequence of operations of the welding system. The timing capacitors 55 are charged to a potential equal to the amplitude of the flat top wave form potential between the center line conductor 45 and the lower conductor 59. The amplitude of this potential is constant as determined by the regulator 93. The charge on the capacitor 32 in the weld circuit is determined during charging by the amplitude of the flat top wave form potential and during discharging by the two variable resistors 34 and 36 connected to the capacitor 32. The firing of the "Weld" thyratron 35 is determined by the potential of the discharging capacitor 32. The firing of the thyratrons 31, 35, and 37 is determined by the four composite potentials made up of flat top wave form potentials of constant amplitude and the potential of the discharging capacitors 5. These constant amplitude potentials are derived between lines 45 and 59 and set to yield the timing desired for each event by the voltage divider 65. For each thyratron these composite potentials are uniform throughout an operation and render the repective thyratrons conductive uniformly at the same instants following the zero instants of the half-periods of the supply. The anode potentials impressed on the thyratrons 31 to 37 vary with the variation in the supply, but these variations have a negligible effect on the timing.

The circuit shown in Fig. 2 illustrates the manner in which my invention can be used with a welder in which the "Hold," "Squeeze" and "Off" operations are timed by the operator or by separate electronic timer. The structure of this circuit is similar to the circuit illustrated in Fig. 1. When the lower line conductor 114 on the output side of the voltage regulator is positive with respect to the upper line conductor 116, grid current flows through capacitor 32, the grid 43, the cathode 41 and a variable resistor 118 to the now negative upper line conductor 116 of the voltage regulator. This grid current charges the capacitor 32 so that its upper side is negative and its lower side is positive. The grid 43 and thyratron 33 is then biased negative with respect to the cathode 41.

When the start switch 100 is closed, current flows from one line conductor 15 through the start switch 100, the closed contactor 102, the activating coil 96 of relay 106 to the other line conductor 15. Relay 98 moves up closing contactor 108. Current flowing through the now closed contactor 108 and the actuating coil 96 locks relay 98 closed. The actuation of relay 98 also closes contactor 110 which essentially connects the cathode of the thyratron 33 to the lower terminal of the capacitor 32. Actuation of relay 98 closes contactor 112 which permits current to flow to the welding transformer 3. Current transformer 40 inductively takes current from the primary 13 of welding transformer 3. This current is rectified by the full-wave rectifier 38, flows through the variable resistor 36 and charges capacitor 32. The current is now being bled off by the variable resistor 34. The orientation of the rectifier 38 is such that the capacitor 32 is charged with a current of polarity opposite to that supplied before the starting switch was closed. As described with reference to Fig. 1, the capacitor 32 is charged at a rate dependent upon the current flowing through the welding transformer 3 and the resistance of the variable resistors 34 and 36. When the grid 43, which is connected to the capacitor 32, reaches the critical potential of the thyratron 33, the thyratron 33 becomes conductive passing current from the voltage regulator through the actuating winding of relay 77. The actuation of relay 77 opens the contactor 102 deactivating the coil 96 of relay 98. Deactivation of the relay 98 opens the contactor 108 preventing current flow through the actuation coil winding 96 in the event that the contactor 102 is again closed. The deactivation of relay 98 opens contacts 112, blocking current flow to the welding transformer 3 and blocking current flow from the voltage regulator to the thyratron 33. Contactor 102 closes when the thyratron 33 becomes non-conductive and when current is no longer flowing through the activating coil relay 77. Grid current now begins to flow through the capacitor 32 and to reset the timer for further operation.

Fig. 3 shows a weld time control transformer which may be used alternatively with the transformers shown in Figs. 1 and 2. A shunt resistor 46 is connected in circuit with the primary 13 of the welding transformer 3. The primary 48 of the shunt transformer 50 is connected to the terminals 52 of the shunt resistor 46. Two resistors 54 and 56 are connected across the terminals of the secondary 58 of the shunt transformer. A center tap 60 on the shunt transformer secondary 58 is connected to a point between the two resistors 54 and 56. Dry plate rectifiers 62 are connected so that current can flow from either end of the secondary 58 of the shunt transformer to the resistors 54 and 56. Another winding 64 is connected between the two outer terminals of the resistors 54 and 56. This winding 64 serves as the primary of a transformer 66, the secondary 77 of which is connected to the anode 28 of the rectifier 38. The remainder of the circuit is the same as shown in Fig. 1 or 2. To simplify the drawings in Fig. 3, I have omitted many elements of the modified structure which were identical with the structure of Fig. 2.

This arrangement differs from the circuit diagram of Fig. 1 in that the circuit component 73 is added in the inductive coupling which connects the welding circuit to the rectifier 38. A shunt transformer 50 is connected in the primary 13 of the welding transformer 3 in Fig. 3, whereas a current transformer 40 is shown in the secondary winding 5 of the welding transformer 3 in Fig. 1.

In the circuit arrangement shown in Fig. 3, E of Equation 2 is proportional to the square of the welding current, and Equations 1 and 2 are of the same form. This result is due to the operational characteristics of dry plate rectifiers. By the choice of proper constants, controllable in the electrical circuit by varying the resistance of the two resistors 34 and 36, the graph of voltage as a function of time can be made to take the same shape as the graph of the temperature in the weld as a function of time. This causes heating in the weld always to be directly proportional to the current flowing into the capacitor 32 as shown by comparison of Equations 1 and 2. After an optimum maximum welding temperature has been chosen, one has only to make manual adjustments in the resistors 34 and 36 to cause the welding machine to limit welding current to the amount of current that will cause the weld to reach the proper temperature. My circuit shown in Fig. 3 then more accurately reproduces electrically the heat characteristics of the weld and causes the welder to be controlled according to the temperature of the weld.

A shunt transformer can be used in connection with the circuit illustrated in any one of the drawings, if the shunt is in the primary of the welding transformer. A shunt transformer in the secondary 5 would, however, probably consume too much power. The current transformer can be used with any of these circuits, and can be connected in either the primary 13, as shown in Fig. 2, or the secondary circuit 5, as shown in Fig. 1, of the welding transformer. The two resistors 54 and 56 in Fig. 3 have a much smaller resistance than the forward resistance of the two rectifiers. It is a characteristic of certain rectifiers, such as dry plate rectifiers, that the current passing through them is proportional to the square of the voltage impressed across them. The output current of the circuit 73 is proportional to the square of the current in the welding circuit since the voltage impressed across the transformer 50 is proportional to the current in the welding circuit. This current flows through the rectifier 38, the series variable resistor 36 into the capacitor 32 charging the capacitor 32 at a rate proportional to the square of the current in the welding transformer 3. The duration of the weld would, then, be inversely proportional to the square of the welding current if no allowance were made for heat flow away from the weld. This circuit could be used if such accurate timing is required that timing proportional to the first power of the welding current would be improper.

In Fig. 4 is shown a modification of the timing circuit of the weld timer. A capacitor 80 is again connected between the grid 43 of the weld time thyratron 35 and the control line conductor 45. A variable resistor 82, one terminal of which is connected to the upper terminal of this capacitor 80, has its other terminal connected to the upper terminal of the second capacitor 84. Another capacitor 83 and another resistor 86 may be connected to the second capacitor 84. This resistor-capacitor ladder network may be repeated as many times as is desired, ending with a resistor 88 connected across the last capacitor. In industrial applications these resistors would probably be ganged so that they can be varied manually as one unit. The series variable resistor 36 is connected to the upper terminal of the first capacitor 80. In all other respects the circuit arrangement is the same as shown in Fig. 1 or Fig. 2. This circuit provides an additional ladder network involving condensers which must be charged in order to fire the weld thyratron. The addition of the ladder network provides a circuit having electrical characteristics closely analogous to the rate of conduction of heat in materials having certain geometric structures. If this timing circuit is applied to some forms of electric furnace or to electrical brazing, the radiation losses from the heated material are considerable, and this ladder network is capable of allowing for radiation losses in determining the duration of current flow in the circuit controlled by my timer.

In accordance with the broader aspects of my invention, the various components disclosed in Fig. 1 may be replaced by others without departing from the scope of my invention. Typical replacements are the following: The electronic contactor 17—19 may be replaced by one including firing thyratrons, or under the proper circumstances, by a mechanical contactor. The timer circuits may include other components than the thyratrons 31 to 37 for example high vacuum tubes or properly connected rectifiers. The capacitor networks 47 to 53 may be replaced by inductive networks. In many applications, also, the timing would be sufficiently accurate if a timer as taught by my invention were used without a voltage regulator.

This circuit arrangement should be useful in other applications than the one shown. It would be within the scope of my invention to adapt it to any heat control device in which the temperature must be controlled accurately. My invention is particularly applicable to apparatus designed to perform work on different materials which have varying properties which would tend to make inconsistent the results of work controlled by an absolute timer.

Although I have shown and described a certain specific embodiment of my invention, I am fully aware that many modifications are practicable. My invention, therefore, is not to be restricted except insofar as is necessitated by the prior art and by the spirit of the appended claims.

I claim as my invention:

1. Apparatus for controlling the supply of current to a load requiring different quantities of power under varying conditions, comprising, in combination, terminals for supplying a potential, a first variable resistor connected to said terminals, a second resistor and a capacitor in parallel connected to said resistor and one terminal of said source of current, a valve which becomes conductive when said capacitor is charged to a predetermined potential, relay means connected to said valve, said relay means including means which stops the flow of load current when current flows through said valve.

2. Apparatus for controlling the supply of current through a welding load through a transformer, a transformer having a primary and a secondary winding, said primary winding receiving a current proportional to said welding current, comprising, in combination, terminals for supplying a potential, a rectifier connected to said secondary winding, a first variable resistor connected to said rectifier, a second resistor and a capacitor in parallel connected to said resistor and one terminal of said transformer secondary, said first resistor calibrated to effect a current flow to said capacitor proportional to the welding current and said second resistor calibrated to effect a current flow from said capacitor proportional to the flow of heat from said welding load, a valve connected to become conductive when said capacitor is charged to a predetermined potential, relay means connected to said valve, said relay means including means which stops the flow of welding current when current flows through said valve.

3. Apparatus for controlling the supply of current through a welding load supplied through welding electrodes, comprising, in combination, terminals for supplying a potential, a control network which receives current inductively from said welding electrodes, a rectifier connected to said control network, a first variable resistor connected to said rectifier, a second resistor and a capacitor in parallel connected to said resistor and said control network so that current flows through said rectifier and said first resistor to charge said capacitor, said first resistor calibrated to effect a current flow to said capacitor proportional to the welding current and said second resistor calibrated to effect a current flow from said capacitor proportional to the flow of heat from said welding load, a valve which becomes conductive when said capacitor is charged to a predetermined potential, relay means connected to said valve, said relay means including means which stops the flow of welding current when current flows through said valve.

4. Apparatus for controlling the supply of current through welding electrodes to a welding load, comprising, in combination, terminals for supplying a potential, a control network which receives current inductively from said welding electrodes, a rectifier connected to said control network, a first variable resistor connected to said rectifier, a second resistor and a capacitor in parallel connected to said resistor and said control network so that current flows through said rectifier and said first resistor to charge said capacitor, said first resistor calibrated to effect a current flow to said capacitor proportional to the welding current and said second resistor calibrated to effect a current flow from said capacitor proportional to the flow of heat from said welding load, a discharge valve having a cathode, anode and control grid, said control grid being connected to said capacitor so that said discharge valve becomes conductive when said capacitor is charged to a predetermined potential.

5. Apparatus for controlling the supply of current through welding electrodes to a workpiece to form a weld in a workpiece, comprising, in combination, a timing circuit having a reactive element connected to receive current which is a function of said welding current, a network of resistors calibrated to effect a current flow from said reactive element proportional to the flow of heat from the zone of the weld and a relay which controls said welding current in dependence upon the voltage impressed across said reactive element.

6. Apparatus for controlling the supply of welding current which is passed through electrodes and materials which are to be welded, comprising, in combination, a timing circuit having a reactive element, a network of resistors calibrated to effect a current flow from said reactive element proportional to the flow of heat from the zone of the weld and a relay which blocks said welding current when the voltage impressed across said reactive element reaches a predetermined magnitude.

7. Apparatus for controlling the supply of welding current which is passed through electrodes into material which are to be welded, comprising, in combination, a timing circuit having a capacitor which receives charging current proportional to said welding current and a resistor of such a magnitude that it draws from said capacitor current proportional to the rate of flow of heat from said weld and a relay which causes said welding current to be blocked when the voltage across said capacitor reaches a predetermined magnitude.

8. Apparatus for controlling the supply of welding current which is passed through electrodes into materials which are to be welded, comprising, in combination, a timing circuit having a capacitor which receives charging current proportional to the square of said welding current and a resistor of such a magnitude that it draws from said capacitor current proportional to the rate of flow of heat from said weld and a relay which blocks said welding current when the voltage across said capacitor reaches a predetermined magnitude.

9. Apparatus for controlling the supply of welding current which is passed through electrodes into materials which are to be welded, comprising, in combination, a timing circuit having a capacitor which receives charging current proportional to said welding current and a ladder of resistors of such a magnitude that it draws from said capacitor current proportional to the rate of flow of heat from said weld and a relay which causes said welding current to be blocked when the voltage across said capacitor reaches a predetermined magnitude.

10. Apparatus for controlling the supply of welding current which is passed through electrodes into materials which are to be welded, comprising, in combination, a timing circuit having a capacitor which receives charging current proportional to the square of said welding current and a ladder of resistors of such a magnitude that it draws from said capacitor, current proportional to the rate of flow of heat from said weld and a relay which causes said welding current to be blocked when the voltage across said capacitor reaches a predetermined magnitude.

11. Apparatus for controlling the supply of welding current which is passed through electrodes in materials which are to be welded, comprising, in combination, a timing circuit having a capacitor which receives charging current proportional to said welding current and a variable resistor which can be preset to draw from said capacitor current proportional to the rate of flow of heat from said weld and a relay which causes said welding current to be blocked when the voltage across said capacitor reaches a predetermined magnitude.

12. Apparatus for controlling the supply of welding current which is passed through electrodes in materials which are to be welded, comprising, in combination, a timing circuit having a capacitor which receives charging current proportional to the square of said welding current and a variable resistor which can be preset to draw from said capacitor, current proportional to the rate of flow of heat from said weld and a relay which causes said welding current to be blocked when the voltage across said capacitor reaches a predetermined magnitude.

13. Apparatus for controlling the supply of welding current which is passed through electrodes into materials which are to be welded, comprising, in combination, a timing circuit having a capacitor which receives charging current proportional to said welding current and a ladder of variable resistors which can be preset to draw from said capacitor current proportional to the rate of flow of heat from said weld and a relay which causes said welding current to be blocked when the voltage across said capacitor reaches a predetermined magnitude.

14. Apparatus for controlling the supply of welding current which is passed through electrodes into materials which are to be welded, comprising, in combination, a timing circuit having a variable capacitor which receives charging current proportional to said welding current and a resistor of such a magnitude that it draws from said variable capacitor current proportional to the rate of flow of heat from said weld and a relay which causes said welding current to be blocked when the voltage across said variable capacitor reaches a predetermined magnitude.

15. Apparatus for controlling the supply of welding current which is passed through electrodes into materials which are to be welded, comprising, in combination, a timing circuit having a variable capacitor which receives charging current proportional to the square of said welding current and a resistor of such a magnitude that it draws from said variable capacitor current proportional to the rate of flow of heat from said weld and a relay which causes said welding current to be blocked when the voltage across said variable capacitor reaches a predetermined magnitude.

16. Apparatus for controlling the supply of welding current which is passed through the electrodes and materials which are to be welded, comprising, in combination, a timing circuit having an inductor which draws a current proportional to said welding current, a rectifier which rectifies current from said inductor, a first resistor connected to said inductor which receives current from said rectifier, a capacitor and a second resistor in parallel connected to said first resistor to receive current from said first resistor, and an electron tube having a control element which blocks the conductivity of said electron tube unless the voltage impressed across said capacitor reaches a predetermined value, terminals to impress voltage across said electron tube and a relay connected to said electron tube which blocks flow of said welding current when said electron tube becomes conductive.

17. Apparatus for controlling the supply of welding current which is passed through the electrodes and materials which are to be welded, comprising, in combination, a timing circuit having an inductor and a rectifier network which draws a current proportional to the square of said welding current, a rectifier which rectifies current from said inductor, a first resistor connected to said inductor which receives current from said rectifier, a capacitor and a second resistor connected in parallel to said first resistor to receive current from said first resistor, and an electron tube having a control element which blocks the conductivity of said electron tube unless the voltage impressed across said capacitor reaches a predetermined value, said terminals to impress voltage across said electron tube and a relay connected to said electron tube which blocks flow of said welding current when said electron tube becomes conductive.

18. Apparatus for controlling the transmission of current through a load to heat said load which loses a portion of the energy supplied thereto by flow of heat, the combination comprising a contactor to be actuated for interrupting the current flow through said load, a reactance, first connections between said reactance and said contactor for controlling the actuation thereof, said contactor permitting current to flow through said load when the potential impressed on said reactance differs in a predetermined sense from a predetermined potential and said contactor interrupting said current flow when the potential impressed on said reactance differs from said predetermined potential in the opposite sense, second connections to be interposed between said load and said reactance for impressing on said reactance a potential approaching said opposite sense at a rate dependent on the current flow through said load and third connections for discharging said reactance as said potential is being impressed at a rate dependent on said heat flow.

19. Apparatus for controlling the supply of current to a load which is to be heated by conduction of current therethrough, comprising, in combination, means adapted to function as a source of power, a control circuit having an element therein, said element being connected in said control circuit to receive a current proportional to the current flowing through said load and circuit means connected to conduct current from said element at a rate proportional to the flow of heat from said load and circuit means responsive to the potential impressed on said element, said circuit means being adapted to stop the flow of current to said load when the potential across said element reaches a predetermined magnitude.

20. Apparatus for controlling the supply of current to a load which is to be heated by conduction of current therethrough, comprising, in combination, means adapted to function as a source of power, a control circuit having an element therein, connections between said element and said load to cause said element to receive current proportional to the current flowing to said load, circuit means connected to said element and so dimensioned as to cause current to flow therefrom at a rate proportional to the flow of heat from said load, and circuit means responsive to the potential impressed across said element, said circuit means being adapted to stop the flow of current to said load when the potential across said element reaches a predetermined magnitude.

21. Apparatus for controlling the supply of current to a load which is to be heated by conduction of current therethrough, comprising, in combination, means adapted to function as a source of power, a control circuit having an element therein, connections between said element and said load to cause said element to receive current proportional to the square of the current flowing to said load, circuit means connected to said element and so dimensioned as to cause current to flow therefrom at a rate proportional to the flow of heat from said load, and circuit means responsive to the potential impressed across said element, said circuit means being adapted to stop the flow of current to said load when the potential across said element reaches a predetermined magnitude.

22. Apparatus for controlling the supply of current to a load which is to be heated by conduction of current therethrough, comprising, in combination, means adapted to function as a source of power, a control circuit having a capacitor therein, said capacitor being so connected in said control circuit that the current flowing to said capacitor is proportional to the current flowing to said load, circuit arrangements adapted to discharge said capacitor at a rate proportional to the flow of heat from said load and circuit means responsive to the potential impressed on said capacitor, said circuit means being adapted to stop the flow of current to said load when the potential across said capacitor reaches a predetermined magnitude.

23. Apparatus for controlling the supply of current to a load which is to be heated by conduction of current therethrough, comprising, in combination, means adapted to function as a source of power, a control circuit having a capacitor therein, connections between said capacitor and said load to cause said element to receive current proportional to the current flowing to said load, circuit means connected to said capacitor to cause current to flow therefrom at a rate proportional to the flow of heat from said load, and circuit means responsive to the potential impressed across said capacitor, said circuit means being adapted to stop the flow of current to said load when the potential across said capacitor reaches a predetermined magnitude.

24. Apparatus for controlling the supply of current to a load which is to be heated by conduction of current therethrough, comprising, in combination, means adapted to function as a source of power, a control circuit having an impedance therein, connections between said impedance and said load to cause said element to receive current proportional to the current flowing to said load, circuit means connected to said impedance to cause current to flow therefrom at a rate proportional to the flow of heat from said load, and circuit means responsive to the potential impressed across said impedance, said circuit means being adapted to stop the flow of current to said load when the potential across said impedance reaches a predetermined magnitude.

RICHARD L. LONGINI.

REFERENCES CITED

The following references are of record in the file of this patent:

UNITED STATES PATENTS

| Number | Name | Date |
|---|---|---|
| 1,168,346 | Thomson | Jan. 18, 1916 |
| 2,083,190 | Dawson | June 8, 1937 |
| 2,145,724 | Horsley | Jan. 31, 1939 |
| 2,226,375 | Gulliksen | Dec. 24, 1940 |